(12) United States Patent
Wallace et al.

(10) Patent No.: US 9,582,852 B2
(45) Date of Patent: Feb. 28, 2017

(54) VIDEO SCALING USING MULTIPLE VIDEO PATHS

(71) Applicant: ViXS Systems, Inc., Toronto (CA)

(72) Inventors: Bradley A. Wallace, Austin, TX (US); Paul M. Astrachan, Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 80 days.

(21) Appl. No.: 14/250,764

(22) Filed: Apr. 11, 2014

(65) Prior Publication Data

US 2015/0296175 A1    Oct. 15, 2015

(51) Int. Cl.
*G06T 3/40* (2006.01)
*G09G 5/00* (2006.01)
*H04N 7/01* (2006.01)

(52) U.S. Cl.
CPC .............. *G06T 3/40* (2013.01); *G09G 5/005* (2013.01); *H04N 7/0117* (2013.01); *H04N 7/0125* (2013.01); *G06T 2200/28* (2013.01); *G09G 2340/02* (2013.01); *G09G 2340/0414* (2013.01); *G09G 2340/0421* (2013.01); *G09G 2360/02* (2013.01); *G09G 2370/08* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 2006/0170710 A1* | 8/2006 | Chao | ...................... | G09G 5/005 |
| | | | | 345/660 |
| 2006/0269166 A1* | 11/2006 | Zhong | ................... | G06T 3/4007 |
| | | | | 382/300 |
| 2011/0221864 A1* | 9/2011 | Filippini | .............. | H04N 13/004 |
| | | | | 348/43 |
| 2012/0120256 A1* | 5/2012 | Hwang | ...................... | G06T 1/20 |
| | | | | 348/207.1 |

* cited by examiner

*Primary Examiner* — Michael Teitelbaum
(74) *Attorney, Agent, or Firm* — Zagorin Cave LLP

(57) ABSTRACT

A video scaling technique includes scaling a first dimension and a second dimension of a frame of video data to generate a scaled frame of video data. The scaling includes scaling the second dimension of a first portion of a frame of video data at a first rate to generate first scaled pixels and scaling the second dimension of a second portion of the frame of video data at the first rate to generate second scaled pixels. The scaling includes combining first output pixels based on the first scaled pixels and second output pixels based on the second scaled pixels to provide pixels of the scaled frame of video data at a second rate. The first rate is a fraction of the second rate.

18 Claims, 5 Drawing Sheets

VIDEO SCALING USING MULTIPLE VIDEO PATHS

BACKGROUND

Field of the Invention

This application is related to video processing systems and more particularly to the presentation of video.

Description of the Related Art

A typical video processing system receives video data in one format (e.g., Advanced Video Coding (AVC), High Efficiency Video Coding (HEVC), Multichannel Audio Digital Interface (MADI), General eXchange Format (GXF), or other suitable video format) and converts the video data to a different format. To properly display the video signal on a particular display device, the video processing system performs resolution adaptation to match the resolution of the video signal to the resolution of the display device.

In general, the video signal includes frames of video data. As referred to herein, a frame is an electronically coded still image of pixels, each of which may be represented by multiple bytes of data. An exemplary standard definition video signal or display device has a horizontal resolution of 640 pixels and a vertical resolution of 480 pixels, totaling approximately 0.3 megapixels per frame. A high-definition television (HDTV or HD) video signal or display device has substantially higher resolution than the exemplary standard definition video signal (e.g., a horizontal resolution of 1920 pixels and a vertical resolution of 1080 pixels, totaling approximately 2.1 megapixels per frame) and may have various formats. An exemplary HD video signal or display device (e.g., a 2K HDTV signal) has a horizontal resolution of 1920 pixels and a vertical resolution of 1080 pixels, totaling approximately 2.1 megapixels per frame. An ultra-high definition television (i.e., Ultra HD, UHD, UHDTV, 4K UHD, HD 4K, 4K UHDTV, 8K UHDTV) video signal or display device has even higher resolution, e.g., 4K UHD has a horizontal resolution of 3840 pixels and a vertical resolution of 2160 pixels, totaling approximately 8.3 megapixels per frame, and 8K UHD has a horizontal resolution of 7680 pixels and a vertical resolution of 4320 pixels, totaling approximately 33.2 megapixels per frame.

A typical video processing system includes a video scaler that converts video signals from one resolution to another. In general, the video scaler converts a signal from a lower resolution to a higher resolution by upconversion or upscaling, although video scalers may also convert the video signal from higher resolution to lower resolution by downconversion or downscaling. Higher resolution formats require processing substantially greater amounts of data (e.g., each frame of a UHDTV video format having a number of pixels that is at least one order of magnitude greater than the number of pixels per frame for a standard video format), which increases the performance specifications of the video scaler. Existing video scalers may not meet those performance specifications. Accordingly, techniques for scaling video data between video formats and higher resolution formats in real-time are desired.

SUMMARY OF EMBODIMENTS OF THE INVENTION

In at least one embodiment of the invention, a method includes scaling a first dimension and a second dimension of a frame of video data to generate a scaled frame of video data. The scaling includes scaling the second dimension of a first portion of a frame of video data at a first rate to generate first scaled pixels and scaling the second dimension of a second portion of the frame of video data at the first rate to generate second scaled pixels. The scaling includes combining first output pixels based on the first scaled pixels and second output pixels based on the second scaled pixels to provide pixels of the scaled frame of video data at a second rate. The first rate is a fraction of the second rate. The frame of video data may have a first number of pixels in the first dimension of the frame and a second number of pixels in the second dimension of the frame. The scaled frame of video data may have a third number of pixels in the first dimension and a fourth number of pixels in the second dimension. The first portion of the frame may have a fifth number of pixels in the first dimension and the second number of pixels in the second dimension. The fifth number of pixels may be a fraction of the first number of pixels. The second portion of the frame may have the fifth number of pixels in the first dimension and the second number of pixels in the second dimension.

In at least one embodiment of the invention, an apparatus includes a frame buffer configured to store a frame of video data having a first dimension and a second dimension. The apparatus includes a video scaler configured to receive the frame of video data from the frame buffer and to generate a scaled frame of video data. The video scaler includes a first video scaler configured to scale the second dimension of a first portion of the frame, and to provide first scaled pixels at a first rate. The video scaler includes a second video scaler configured to scale the second dimension of a second portion of the frame and to provide second scaled pixels at the first rate. The video scaler includes a compositor configured to combine first output pixels based on the first scaled pixels and second output pixels based on the second scaled pixels to provide pixels of the scaled frame of video data at a second rate. The first rate is a fraction of the second rate. The frame of video data may have a first number of pixels in the first dimension of the frame and a second number of pixels in the second dimension of the frame. The scaled frame of video data may have a third number of pixels in the first dimension and a fourth number of pixels in the second dimension. The first portion of the frame may have a fifth number of pixels in the first dimension and the second number of pixels in the second dimension. The fifth number of pixels may be a fraction of the first number of pixels. The second portion of the frame may have the fifth number of pixels in the first dimension and the second number of pixels in the second dimension.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
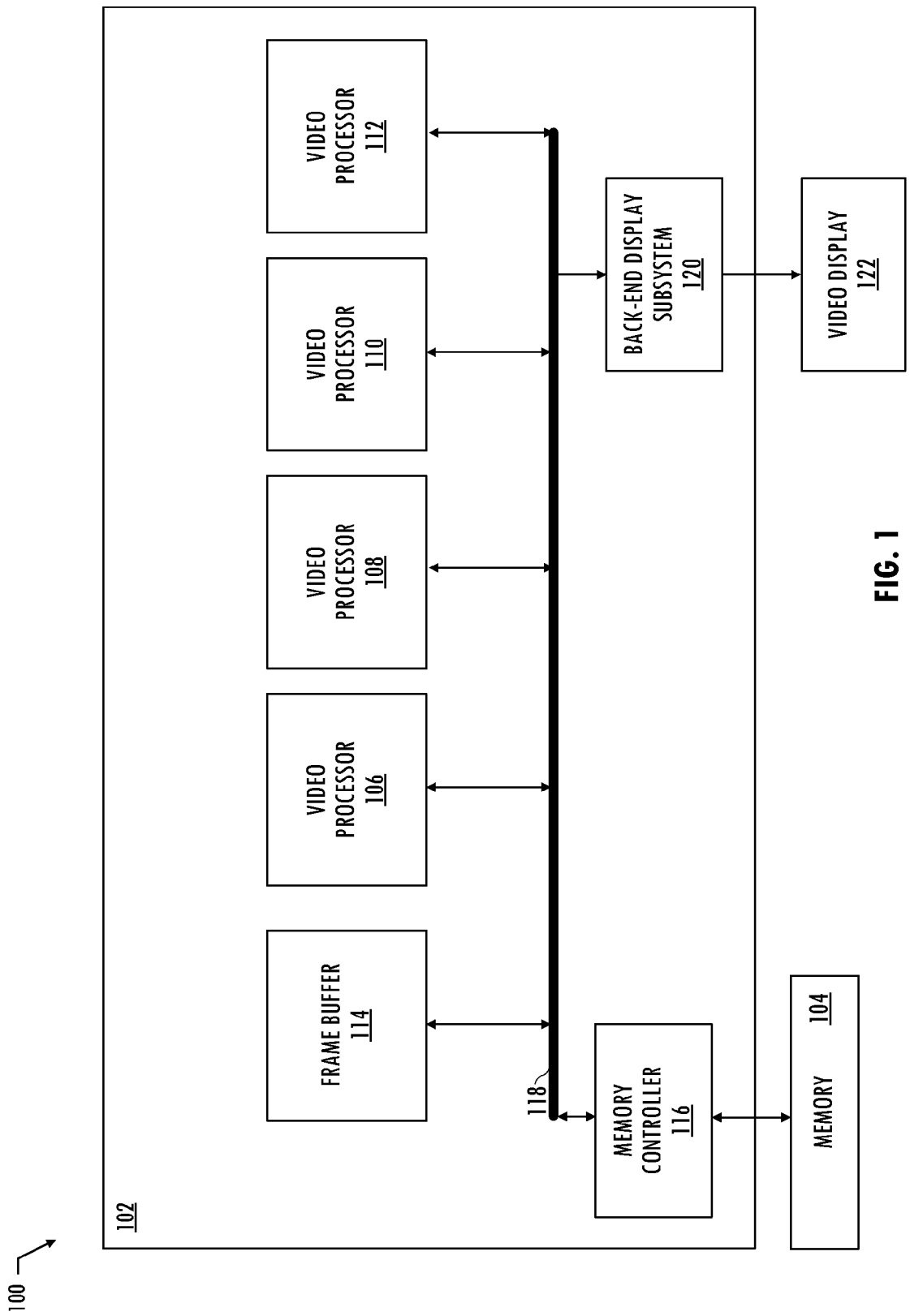
FIG. 1 illustrates a functional block diagram of an exemplary video processing system.

Referring to FIG. 1, a typical video data processing system includes system memory 104 and a video system-on-a-chip (SOC) integrated circuit 102, which includes memory controller 116 and multiple video processing circuits and associated circuits. Video SOC 102 receives compressed video data from memory 104 using memory controller 116. Memory controller 116 provides the video data to temporary on-chip storage (e.g., frame buffer 114) and/or to one or more video processing circuits (e.g., video processors 106, 108, 110, and 112). The video processing modules may decompress (i.e., decode, uncompress, or expand) the compressed video data to recover uncompressed (i.e., raw) video data. Video SOC 102 may write uncompressed video data to system memory 104 for subsequent use by one or more video processing modules. The one or more video processing modules retrieve the uncompressed video data, perform bit-rate reduction, resolution change, and/or format conversion, and may write processed, uncompressed video data back to memory 104 and/or provide the processed video data to backend display subsystem 120.

Due to the large quantity of data involved, only small quantities of video data may be available to a particular video processing circuit at a particular time. Individual frames or a portion of an individual frame may be available for access by a particular video processing circuit from frame buffer 114. Memory controller 116 reads the video data from system memory and stores it in frame buffer 114 for processing and, in some cases, memory controller 116 writes processed data back to memory 104. Video SOC 102 includes a front-end display subsystem that receives video data and generates uncompressed and/or processed video data in a form usable by the back-end subsystem. Typical front-end display subsystem operations include decoding, decompression, format conversion, noise reduction (e.g., temporal, spatial, and mosquito noise reduction) and other interface operations for video data having different formats. (e.g., multiple streams). Back-end display subsystem 120 delivers the uncompressed video data to a display device (e.g., video display 122, projector, or other electronic device).

Figure 2:
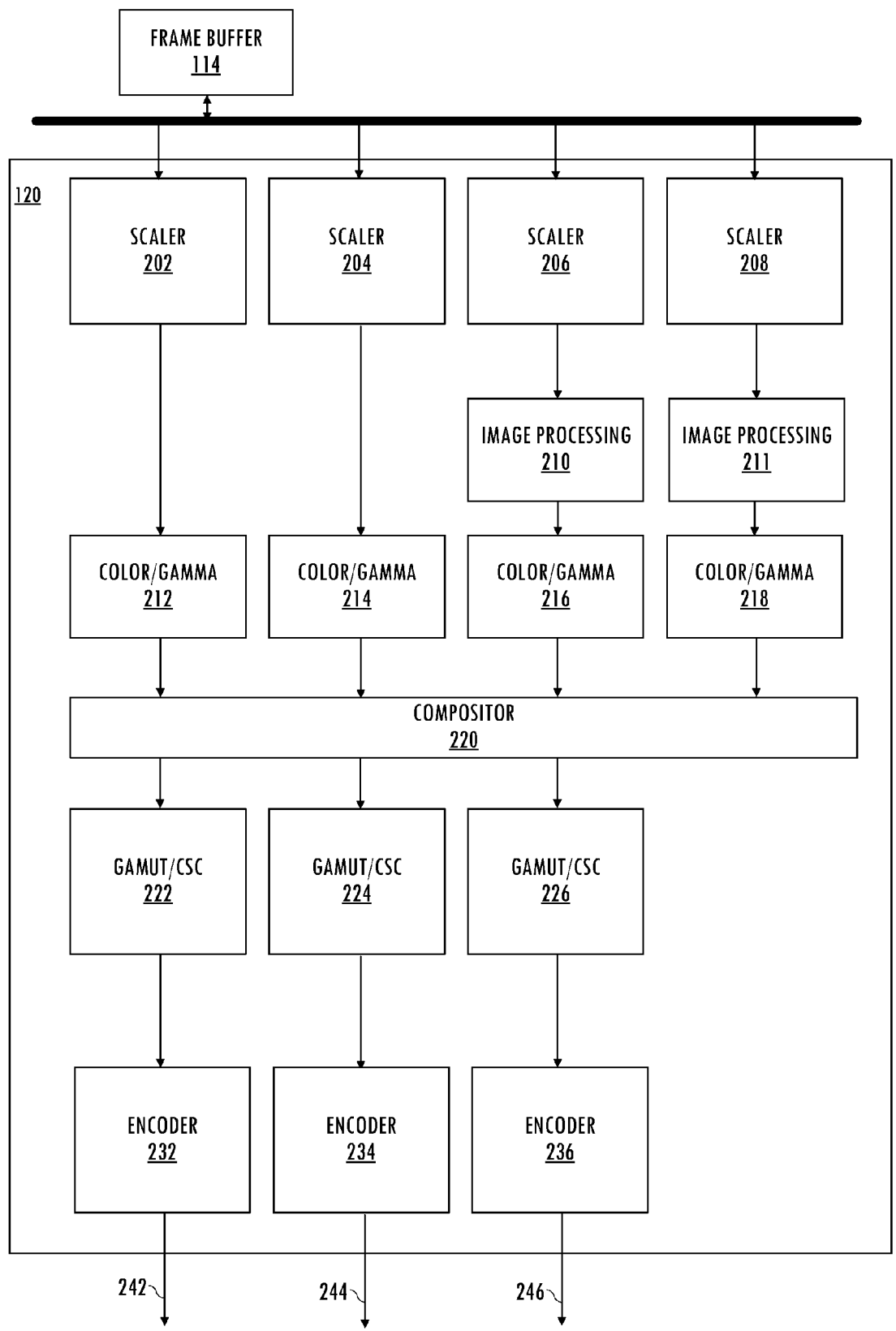
FIG. 2 illustrates a functional block diagram of an exemplary display subsystem of the video processing system of FIG. 1.

Referring to FIG. 2, an exemplary back-end display subsystem 120 receives video data from frame buffer 114 and provides processed video data to one or more of audio/video interfaces 242, 244, and 246 at an interface-specific frame rate. An audio/video interface may be a composite component interface, a High-Definition Multimedia Interface (HDMI) interface, an HD interface or other suitable interface. Back-end display subsystem 120 includes multiple video paths for multiple video planes. The individual video planes are separately scaled using scalers 202, 204, 206, and 208, which may scale video data for the same or different display formats compliant with the specifications of a corresponding interface. The scaled video data may be further processed for color and/or image enhancement by using corresponding processing modules (e.g., color/gamma processors 212, 214, 216, and 218 and/or image processors 210 and 211). Individual video planes may be used to generate separate output video signals or may be combined by compositor 220 to generate one or more composite output video signals. The output of compositor 220 may be further processed, e.g., by gamut/color space conversion processors 222, 224, and 226, and corresponding encoders 232, 234, and 236, before providing the output video signal to one or more of audio/video interfaces 242, 244, and 246, respectively. Circuits included in back-end display subsystem 120 may all receive clock signals having a frequency sufficient to process video data having a maximum resolution (e.g., HD resolution).

As the resolution standards for the output video signal increase, e.g., from 2K HD resolution to 4K UHD resolution, the amount of video data per frame increases substantially. Circuits designed for lower resolution formats may not be able to operate with sufficient performance (e.g., deliver video data at a target interface frame rate) for higher resolution formats. Merely increasing the operating speed of existing circuits by increasing clock rates and mapping an existing design to a different manufacturing technology that results in circuits that operate at those increased clock rates may be insufficient to obtain the required performance for the increased pixel throughput. Circuit redesign for increased performance and/or different manufacturing technologies increases time-to-market of video SOCs. Operating the entire video SOC at an increased clock rate may increase the power consumption of the video SOC. In addition, to support each additional video standard using dedicated circuits increases the numbers of processors and storage elements, which increase area of the video SOC, further increasing cost.

Figure 3:
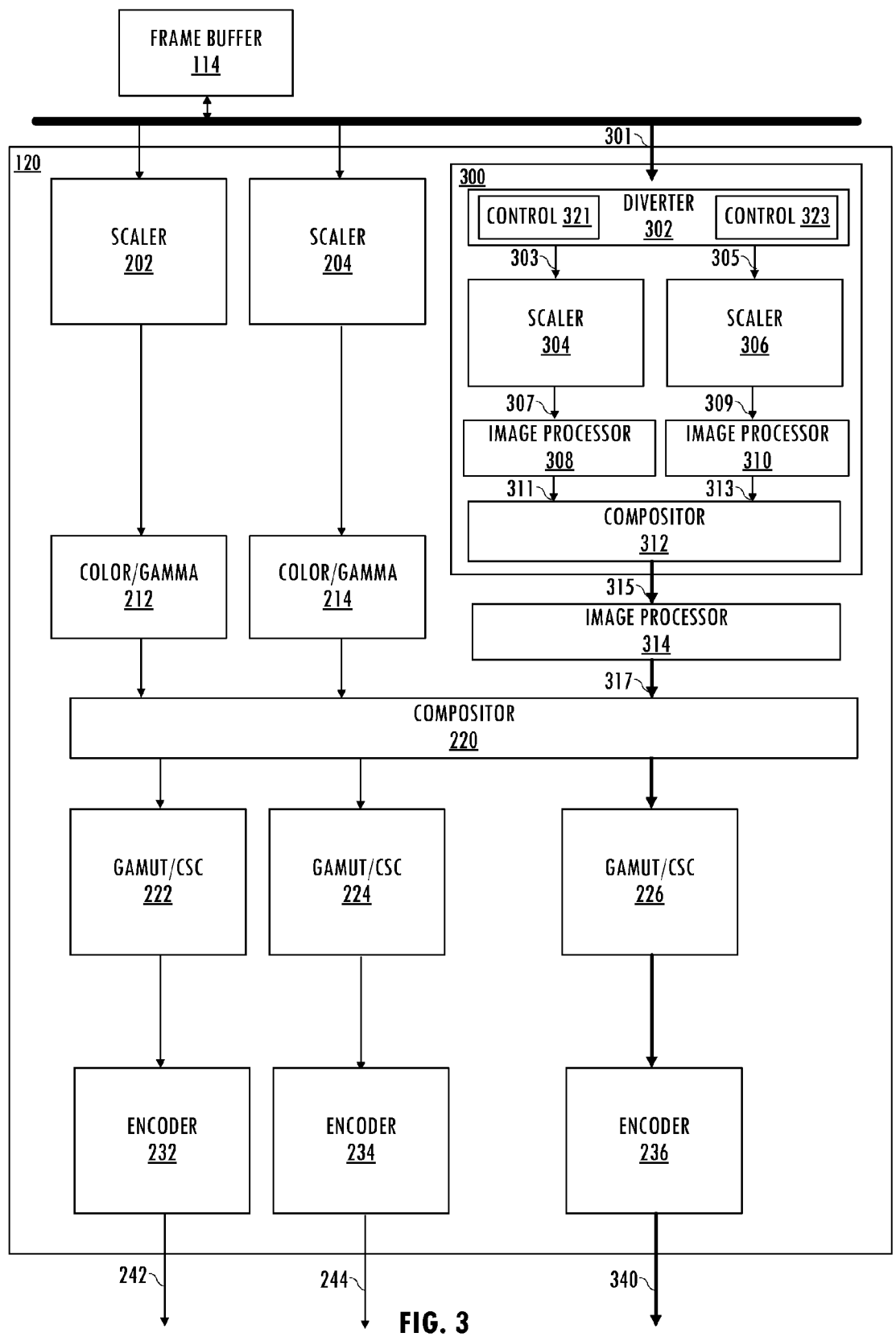
FIG. 3 illustrates a functional block diagram of an exemplary display subsystem consistent with at least one embodiment of the invention.
Figure 4:
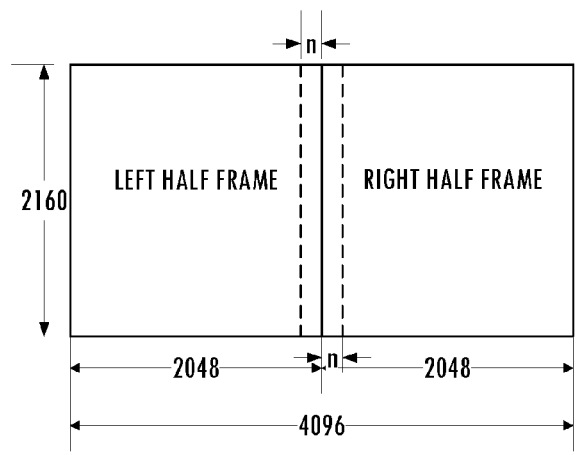
FIG. 4 illustrates an exemplary frame of video partitioned consistent with at least one embodiment of the invention.

Referring to FIG. 3, in at least one embodiment of a video SOC, back-end display subsystem 120 includes video scaler 300 that scales a high resolution video signal by an arbitrary scaling ratio using multiple lower resolution video paths. Video scaler 300 includes multiple video paths, each of which processes a distinct portion of a frame of the video data. Referring to FIGS. 3 and 4, diverter 302 partitions a frame of video data into multiple frame portions to be separately processed by corresponding video paths. For example, diverter 302 may include a controller for each video path (e.g., controller 321 and controller 323). Each of those controllers is coupled to a common memory arbiter and interface to frame buffer 114. Each controller stores a memory base address and width and height parameters that are separately programmed for each video path to separately access pixels of a corresponding frame portion. Controller 321 accesses a first portion of a line of the frame and controller 323 accesses a second portion of the line of the frame. FIG. 4 illustrates an exemplary 4K UHD frame of video data having a format that is 4096 pixels wide and is partitioned into two portions (e.g., left-half frame and right-half frame) each having half the width (e.g., a 2K HD width of 2048 pixels), but the same height as the 4K UHD frame (e.g., 2160 pixels high). A separate video path of video scaler 300 processes each of those frame portions (e.g., video scaler 304 processes the left-half portion and video scaler 306 processes the right-half portion).

Figure 5:
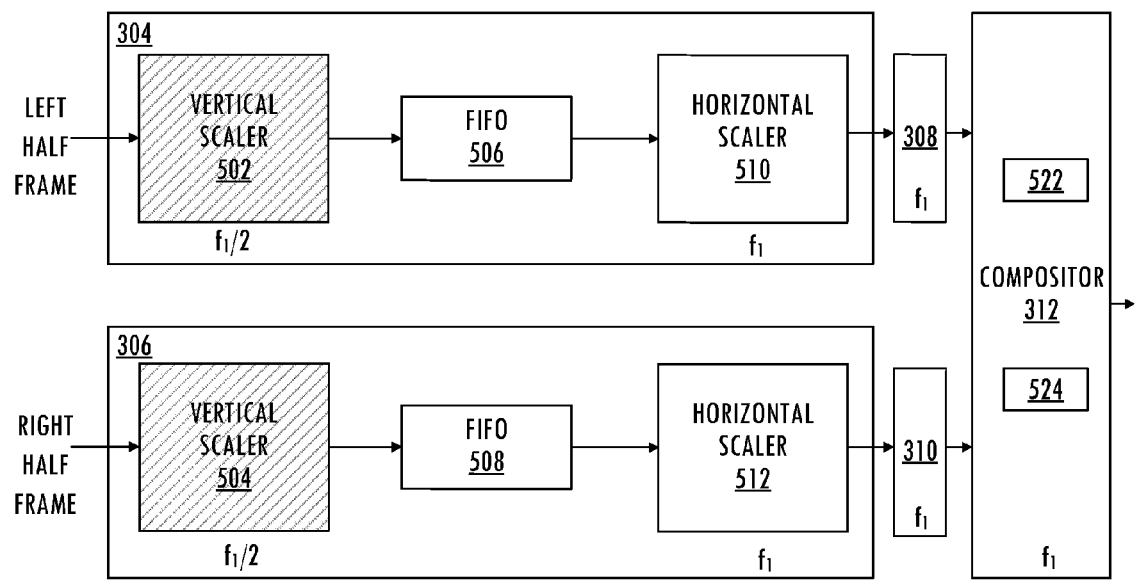
FIG. 5 illustrates a functional block diagram of a portion of an exemplary video scaler of the display subsystem of FIG. 3 consistent with at least one embodiment of the invention.

Referring to FIG. 5, video scaler 304 and video scaler 306 are two-dimensional video scalers that scale a received frame portion by an arbitrary, predetermined scaling ratio. The arbitrary scaling ratio allows for implementations of various display modes, including non-linear stretch (i.e., panoramic), pan-and-scan, letterbox, squeezed, pillarbox, zoom, picture-in-picture, picture-by-picture, and/or other display modes. Although the two-dimensional scaling operation may be performed using a true two-dimensional filter (bilinear interpolation, bicubic interpolation, or other suitable two-dimensional sample rate converting technique), in general, implementation using two one-dimensional filters is more practical for arbitrary scaling ratios. Each dimension may be implemented as a polyphase filter structure (i.e., an L-phase, N-tap filter, representing a filter waveform by N filter coefficients, which are are oversampled by L for L distinct phases by which an input signal may be scaled). For example, video scalers 304 and 306 each include two one-dimensional filters: one filter for scaling the vertical dimension of a frame (e.g., vertical scaler 502 or vertical scaler 504) and one filter for the scaling the horizontal dimension of a frame (e.g., horizontal scaler 510 or horizontal scaler 512. Scaled pixels may be communicated from vertical scalers 502 and 504 to horizontal scalers 510 and 512, respectively using first-in-first-out storage buffers 506 and 508, respectively.

Each of vertical scalers 502 and 504 may be a 6-tap, 64-phase filter having fully programmable coefficients. However, other numbers of taps and phases may be used. Vertical scalers resize the frame portion to a height having an arbitrary, predetermined number of pixels. In general, the vertical scaler is an area-intensive circuit because it has typically four to six line buffers that are the width of the source video (e.g. 1920 pixels wide in the case of HD source or 3840 pixels wide in the case of UHD video). When using a single vertical scaler to scale video, the vertical scaler must operate at least as fast as an output interface rate. For example, for 2K HD video, a high-definition multimedia interface (HDMI) pixel rate is 148.5 MHz and for 4K UHD, the HDMI pixel rate is 594 MHz.

Each of horizontal scalers 510 and 512 may be a 10-tap, 64-phase filter, having fully programmable coefficients. However, other numbers of taps and phases may be used. Each horizontal scaler includes a line buffer that is as wide as the received frame portion (e.g., 2048 pixels wide). A boundary matching technique initializes the phases of horizontal scalers 510 and 512 (e.g., filter taps are stored in memory and loaded to facilitate boundary matching). As each horizontal scaler processes pixels across a line of the frame, active phase(s) change according to the scale ratio. Filter coefficients may be stored in memory using any suitable storage configuration. In at least one embodiment of a horizontal scaler, the filter coefficients are organized as an array of individual coefficients that are sequentially stored in memory using any suitable order (e.g., in phase order, where all N taps for phase 1 are stored in sequence for all L phases, or in coefficient order, where all L values of tap n are stored in sequence for all N taps). In other embodiments of a horizontal scaler, the filter coefficients are organized in L individual phase words that are stored in separate memory locations, where each phase word l includes concatenated bits corresponding to the N tap values for the corresponding phase.

In an exemplary implementation of a 10-tap, 64-phase filter, ten coefficients representing the filter waveform are oversampled by 64, for 64 distinct phases by which an input signal may be filtered. Six hundred and forty filter coefficients are stored sequentially in memory, i.e., all 64 values of tap n are stored in sequence for all ten taps. The ten coefficients are selected based on an index of a starting phase (i.e., initial_phase) and then each coefficient after that is stored L (e.g., L=64) locations away in the array. The starting phase is determined based on the scale ratio. For example, if upscaling by 4/3 (i.e., scaling ratio, r=0.75), the starting phase may be determined based on the fractional portion of the scale ratio (e.g., initial_phase=r×L=0.75× 64=48) and the set of filter taps for the starting phase are separated by L locations away (e.g., 48, 112, 176, 240, etc.). The taps of other phases are determined accordingly. As the horizontal scaler moves horizontally to a next pixel in a line of pixels, the fractional portion of multiples of the scaling ratio are used to determine the next filter coefficients (e.g., 0.75+0.75=1.5 having a fractional portion of 0.5 and the coefficient indices are 32, 96, 160, 224, etc.). Note that other techniques for implementing the polyphase filter may be used. In addition, note that initial_phase index need not be an integer (i.e., r×L may be a number having a fractional portion) and may have a value between two sequential phases. In such cases, each coefficient is determined by interpolating between the coefficients for the two sequential phases. To begin filtering at a boundary in the frame of pixels, the system initializes initial_phase for each horizontal scaler, e.g., by initializing the fractional portion of a phase counter used to index the coefficients to make the phase and coefficient selection continuous across the boundary.

To further facilitate continuity at a boundary between frame portions, horizontal scaler 512 is initialized by processing at least N pixels of data from the end of the left-hand frame. Similarly, at the end of scaling a line of the left-half frame, horizontal scaler 510 processes at least N pixels after the end of the left-half frame to flush the filter engine, pixels extending between dashed lines and the frame portion boundary of FIG. 4. Referring back to FIG. 5, as a result, the scaled frame portions output from the horizontal scalers 510 and 512 include overlapping scaled pixels. Compositor 312 recognizes that the last N or more pixels from horizontal scaler 510 and the first N or more pixels from horizontal scaler 512 include some data that is incorrect. Accordingly, separate crop registers of compositor 312 receive those pixels, and compositor 312 generates an output frame based on the scaled frame portions provided by horizontal scalers 510 and 512 and/or image processors 308 and 310.

Compositor 312 crops the scaled frame portions to exclude the overlapping pixels and stores the overlapping pixel information. Those pixels may be combined using any suitable technique (e.g., averaging, non-linear blending). Compositor 312 may combine the overlapping pixels stored in a crop register (e.g., crop register 522 or crop register 524) with the corresponding pixels of the other half frame of video data to generate a single set of output pixels for the corresponding boundary locations of the frame. Compositor 312 then constructs an output scaled frame of video using the cropped scaled frame portions and the combined boundary pixels, e.g., by placing the scaled left-hand frame portion and scaled right-hand frame portions side-by-side. In at least one embodiment of a video SOC, the outputs of horizontal scalers 510 and 512 are processed prior to compositing, e.g., using programmable color space conversion or other video processing techniques.

Still referring to FIG. 5, since vertical scalers 502 and 504 vertically scale only half of a frame of video data vertical line by vertical line, vertical scalers 502 and 504 may operate at half the frequency (e.g., $f_1/2$) of operation of horizontal scalers 510 and 512 and compositor 312. For example, a UHD video signal can be vertically scaled by two HD vertical scalers running at half the UHD clock rate. These two video paths are combined with the compositor to make a UHD plane. Area savings come from sharing the HD video paths that may otherwise be used in other modes of operating the video SOC for processing multiple HD video signals and operating all elements at the same rate.

The scaling techniques may produce artifacts from aliasing (e.g., jaggies) and adaptive scaling and post-processing techniques may be implemented by image processors 308 and 310 and/or image processor 314 to reduce artifacts introduced by the scaler. For example, image processors 308 and 310 and/or image processor 314 may implement one or more of the techniques that match lines or edges to align the filter along a particular direction to avoid stair-step artifacts along diagonal lines, techniques that improve edge transitions after scaling, techniques that denoise and enhance detail on an individual frame and/or across multiple frames using temporal denoising techniques, and color, contrast, and sharpness management techniques. In other embodiments of scaler 300, image processors 308 and 310 and/or image processor 314 are excluded. Portions of the lower resolution video paths operate at a lower clock rate than other portions of the high resolution video path, which operate at a higher clock rate. Those portions may also include buffers that are a fraction of the size of buffers used by other portions of the high resolution video path.

Note that in other embodiments of video scaler 300, a frame of video data is partitioned into M frame portions by diverter 302 and video scaler 300 includes M corresponding video data paths (i.e., M corresponding video scalers, which may be coupled to M corresponding image processors). Portions of those M corresponding video paths (e.g., M vertical scalers) may operate a frequency that is 1/M of the interface pixel rate, while the compositor and horizontal scalers operate at the interface pixel rate.

Thus various techniques for scaling video data using multiple video paths are disclosed. While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and non-transitory computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the non-transitory computer-readable media may store instructions as well as data that can be used to implement the invention. The instructions/data may be related to hardware and/or software or firmware executable on a processor circuit, or combinations thereof. As referred to herein, a non-transitory computer-readable medium includes at least a disk, tape, or other magnetic, optical, or electronic storage medium.

Figure 6:
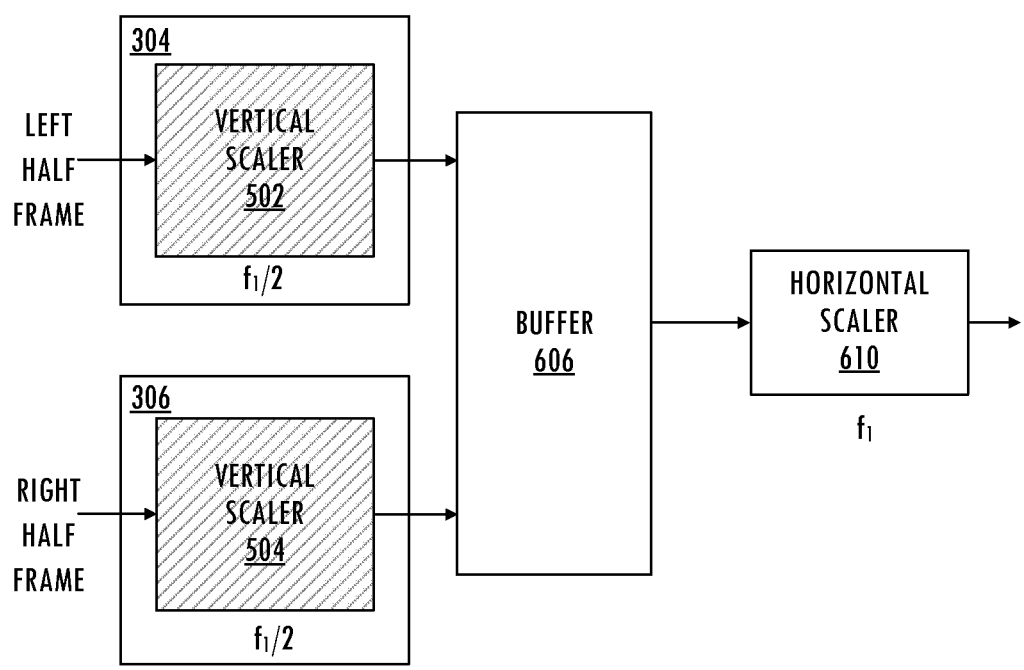
FIG. 6 illustrates a functional block diagram of a portion of an exemplary video scaler of the display subsystem of FIG. 3 consistent with at least one embodiment of the invention.

The description of the invention set forth herein is illustrative, and is not intended to limit the scope of the invention as set forth in the following claims. For example, while the invention has been described in embodiments in which vertical scalers 502 and 504 provide scaled pixels to separate storage buffers 506 and 508, respectively, and horizontal scalers 510 and 512, respectively, one of skill in the art will appreciate that the teachings herein can be utilized by accessing first-in-first-out storage buffers 506 and 508 as unified buffer 606 of FIG. 6 that provides data to one or more horizontal scalers (e.g., horizontal scaler 610), which process the contents of unified buffer 606 without generating the overlapping output pixels and subsequent cropping of the embodiments of FIGS. 3 and 5. Variations and modifications of the embodiments disclosed herein, may be made based on the description set forth herein, without departing from the scope and spirit of the invention as set forth in the following claims.

What is claimed is:

1. A method comprising:
scaling a first dimension and a second dimension of a frame of video data to generate a scaled frame of video data, wherein the scaling comprises:
scaling the second dimension of a first portion of the frame of video data to generate first scaled pixels at a first rate;
scaling the second dimension of a second portion of the frame of video data to generate second scaled pixels at the first rate;
scaling the first dimension of the first scaled pixels to generate first output pixels at a second rate;
scaling the first dimension of the second scaled pixels to generate second output pixels at the second rate; and
combining the first output pixels and the second output pixels to provide pixels of the scaled frame of video data at the second rate, the first rate being a fraction of the second rate,
wherein scaling the second dimension of the first portion of the frame of video data uses a first clock signal, scaling the second dimension of the second portion of the frame of video data uses the first clock signal, scaling the first dimension of the first scaled pixels uses a second clock signal, scaling the first dimension of the second scaled pixels uses the second clock signal, and the combining uses the second clock signal to generate the scaled frame of video data, the second clock signal having a frequency that is at least twice a frequency of the first clock signal, the scaled frame of video data having a greater number of pixels than the first output pixels, and the greater number of pixels being greater than a number of pixels in the second output pixels.

2. The method, as recited in claim 1,
wherein the frame of video data has a first number of pixels in the first dimension and a second number of pixels in the second dimension,
wherein the scaled frame of video data has a third number of pixels in the first dimension and a fourth number of pixels in the second dimension,
wherein the first portion of the frame of video data has a fifth number of pixels in the first dimension and the second number of pixels in the second dimension, the fifth number of pixels being a fraction of the first number of pixels, and
wherein the second portion of the frame of video data has the fifth number of pixels in the first dimension and the second number of pixels in the second dimension.

3. The method, as recited in claim 2, wherein the fifth number of pixels is half the first number of pixels.

4. The method, as recited in claim 1, wherein the second rate is at least two times the first rate.

5. The method, as recited in claim 1, wherein the first dimension is a horizontal dimension and the second dimension is a vertical dimension.

6. The method, as recited in claim 1, further comprising:
initializing a phase of a first filter used for scaling the first dimension of the first scaled pixels; and initializing a phase of a second filter used for scaling the first dimension of the second scaled pixels.

7. The method, as recited in claim 1, wherein the combining comprises:
   mapping the first output pixels to a first portion of the scaled frame of video data;
   mapping the second output pixels to a second portion of the scaled frame of video data, the first and second portions of the scaled frame of video data being mutually exclusive; and
   cropping overlapping pixels associated with a boundary between the first and second portions of the scaled frame of video data.

8. An apparatus comprising:
   a video scaler configured to scale a first dimension and a second dimension of a frame of video data to generate a scaled frame of video data, the video scaler comprising:
      a first video scaler configured to scale the second dimension of a first portion of the frame of video data and to provide first scaled pixels at a first rate;
      a second video scaler configured to scale the second dimension of a second portion of the frame of video data and to provide second scaled pixels at the first rate;
      a third video scaler configured to scale the first dimension of the first scaled pixels to provide first output pixels at a second rate; and
      a fourth video scaler configured to scale the first dimension of the second scaled pixels to provide second output pixels at the second rate; and
      a compositor configured to combine the first output pixels and the second output pixels to provide pixels of the scaled frame of video data at a second rate, the first rate being a fraction of the second rate,
   wherein the first and second video scalers are responsive to a first clock signal, and the third and fourth video scalers and the compositor are responsive to a second clock signal, the first clock signal having the first rate and the second clock signal having the second rate, and
   wherein the second clock signal has a frequency that is at least twice a frequency of the first clock signal, the scaled frame of video data having a greater number of pixels than the first output pixels, and the scaled frame of video data having the greater number of pixels being greater than s number of pixels in the second output pixels.

9. The apparatus, as recited in claim 8,
   wherein the frame of video data has a first number of pixels in the first dimension and a second number of pixels in the second dimension,
   wherein the scaled frame of video data has a third number of pixels in the first dimension and a fourth number of pixels in the second dimension,
   wherein the first portion of the frame of video data has a fifth number of pixels in the first dimension and the second number of pixels in the second dimension, the fifth number of pixels being a fraction of the first number of pixels, and
   wherein the second portion of the frame of video data has the fifth number of pixels in the first dimension and the second number of pixels in the second dimension.

10. The apparatus, as recited in claim 9, wherein the fifth number of pixels is half the first number of pixels.

11. The apparatus, as recited in claim 8, wherein the second rate is at least two times the first rate.

12. The apparatus, as recited in claim 8, wherein the first dimension is a horizontal dimension and the second dimension is a vertical dimension.

13. The apparatus, as recited in claim 8, wherein the compositor combines and crops overlapping pixels associated with a boundary between the first and second portions of the frame of video data to thereby provide the scaled frame of video data.

14. The apparatus, as recited in claim 8, further comprising: a first storage buffer configured to receive the first scaled pixels from the first video scaler and to provide the first scaled pixels to the third video scaler; and a second storage buffer configured to receive the second scaled pixels from the second video scaler and to provide the second scaled pixels to the fourth video scaler.

15. The apparatus, as recited in claim 8, wherein the compositor module comprises a crop storage element.

16. An apparatus comprising:
   means for scaling a first portion of a frame of video data to generate first scaled pixels at a first rate;
   means for scaling a second portion of the frame of video data to generate second scaled pixels at the first rate;
   means for scaling the first scaled pixels to provide first output pixels at a second rate, the first rate being a fraction of the second rate; and
   means for scaling the second scaled pixels to provide second output pixels at the second rate; and
   means for combining the first output pixels and the second output pixels to provide pixels of the scaled frame of video data at the second rate,
   wherein the means for scaling the first portion of the frame of video data uses a first clock signal, the means for scaling the second portion of the frame of video data uses the first clock signal, the means for scaling the first scaled pixels uses a second clock signal, the means for scaling the second scaled pixels uses the second clock signal, and the means for combining uses the second clock signal to generate the scaled frame of video data, the second clock signal having a frequency that is at least twice a frequency of the first clock signal, the scaled frame of video data having a greater number of pixels than the first output pixels, and the greater number of pixels being greater than a number of pixels in the second output pixels.

17. The apparatus, as recited in claim 8, further comprising:
   a frame buffer coupled to the video scaler and configured to store the frame of video data.

18. The apparatus, as recited in claim 17, wherein buffers of the first and second video scalers each have a width that is a fraction of a width of the frame buffer.

* * * * *

UNITED STATES PATENT AND TRADEMARK OFFICE
CERTIFICATE OF CORRECTION

PATENT NO. : 9,582,852 B2
APPLICATION NO. : 14/250764
DATED : February 28, 2017
INVENTOR(S) : Bradley A. Wallace et al.

Page 1 of 1

It is certified that error appears in the above-identified patent and that said Letters Patent is hereby corrected as shown below:

In the Claims

In Column 9, Line 47, please replace "than s" with --than a--.

Signed and Sealed this
Eleventh Day of April, 2017

Michelle K. Lee
*Director of the United States Patent and Trademark Office*